(12) United States Patent
Chou et al.

(10) Patent No.: US 11,435,500 B2
(45) Date of Patent: Sep. 6, 2022

(54) OPTICAL LENS ASSEMBLY AND ELECTRONIC DEVICE

(71) Applicant: LARGAN PRECISION CO., LTD., Taichung (TW)

(72) Inventors: Ming-Ta Chou, Taichung (TW); Ming-Shun Chang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 371 days.

(21) Appl. No.: 16/699,813

(22) Filed: Dec. 2, 2019

(65) Prior Publication Data

US 2020/0301044 A1 Sep. 24, 2020

(30) Foreign Application Priority Data

Mar. 20, 2019 (TW) ................. 108109634

(51) Int. Cl.
*G02B 7/02* (2021.01)
*G02B 1/04* (2006.01)
*G02B 5/00* (2006.01)
*B29C 45/16* (2006.01)
*B29C 45/14* (2006.01)
*G02B 9/34* (2006.01)

(52) U.S. Cl.
CPC ........ *G02B 1/041* (2013.01); *B29C 45/14778* (2013.01); *B29C 45/16* (2013.01); *G02B 5/003* (2013.01); *G02B 9/34* (2013.01)

(58) Field of Classification Search
CPC .......... G02B 1/041; G02B 5/003; G02B 9/34; G02B 7/022; G02B 7/026; G02B 7/021; G02B 13/0055; G02B 1/04; G02B 5/00; G02B 7/02; B29C 45/14778; B29C 45/16; B29C 45/1635; B29C 45/14; B29K 2995/0025; B29K 2995/0026; B29L 2011/0016; G03B 11/00
See application file for complete search history.

(56) References Cited

U.S. PATENT DOCUMENTS

| | | | |
|---|---|---|---|
| 1,004,841 | A | 10/1911 | Austin et al. |
| 6,238,600 | B1 | 5/2001 | Kuo et al. |
| 6,567,224 | B2 | 5/2003 | Hatakeyama et al. |
| 6,900,953 | B2 | 5/2005 | Okumura |

(Continued)

FOREIGN PATENT DOCUMENTS

TW 201821848 A 6/2018

*Primary Examiner* — Balram T Parbadia
(74) *Attorney, Agent, or Firm* — McClure, Qualey & Rodack, LLP

(57) ABSTRACT

An optical lens assembly has a central axis and includes at least one dual molded lens element. The dual molded lens element includes a light transmitting portion and a light absorbing portion, wherein the light transmitting portion includes an optical effective region and a lens peripheral region, and the lens peripheral region surrounds the optical effective region. The light absorbing portion surrounds the optical effective region. The light transmitting portion and the light absorbing portion are made of different plastic materials with different colors, and are integrally formed by an injection molding. The light transmitting portion or the light absorbing portion includes a plurality of annular convex structures, and the annular convex structures surround the central axis.

14 Claims, 19 Drawing Sheets

(56) References Cited

U.S. PATENT DOCUMENTS

| | | | |
|---|---|---|---|
| 7,719,776 B2 | 5/2010 | Kodama et al. | |
| 8,031,412 B2 | 10/2011 | Shintani | |
| 8,102,609 B2 | 1/2012 | Tsuchiya et al. | |
| 8,455,810 B2 | 6/2013 | Tomioka et al. | |
| 8,817,396 B2 | 8/2014 | Mori et al. | |
| 8,964,313 B2 | 2/2015 | Kobayashi et al. | |
| 8,964,314 B2 | 2/2015 | Koike et al. | |
| 8,995,058 B2 | 3/2015 | Okada et al. | |
| 9,140,826 B2 | 9/2015 | Miyazaki et al. | |
| 9,151,925 B2 | 10/2015 | Akutsu et al. | |
| 9,158,037 B2 | 10/2015 | Otsuka et al. | |
| 9,164,253 B2 | 10/2015 | Koike et al. | |
| 9,174,399 B2 | 11/2015 | Watanabe et al. | |
| 9,193,117 B2 | 11/2015 | Fujii et al. | |
| 9,223,115 B2 | 12/2015 | Fujii et al. | |
| 9,360,666 B2 | 6/2016 | Kikuchi et al. | |
| 9,393,747 B2 | 7/2016 | Watanabe et al. | |
| 9,505,647 B2 | 11/2016 | Ogura | |
| 9,581,704 B2 | 2/2017 | Fullerton et al. | |
| 9,596,397 B2 | 3/2017 | Rammah et al. | |
| 9,625,621 B2 | 4/2017 | Matsumoto | |
| 9,632,277 B2 | 4/2017 | Akutsu et al. | |
| 9,638,832 B1 | 5/2017 | Su | |
| 9,715,042 B2 | 7/2017 | Yamamoto et al. | |
| 9,726,846 B2 | 8/2017 | Bone | |
| 9,823,544 B2 | 11/2017 | McIntyre et al. | |
| 9,989,674 B2 | 6/2018 | Kikuchi et al. | |
| 2007/0291386 A1* | 12/2007 | Yoshikawa | G02B 1/118 359/885 |
| 2011/0134548 A1* | 6/2011 | Lai | H04N 5/2257 359/819 |
| 2014/0160581 A1* | 6/2014 | Cho | G02B 13/0035 359/738 |
| 2016/0313472 A1* | 10/2016 | Huang | G02B 13/008 |
| 2016/0370580 A1* | 12/2016 | Takada | G02B 5/005 |
| 2017/0023762 A1 | 1/2017 | Tobita | |
| 2017/0082823 A1* | 3/2017 | Hwang | G02B 27/646 |
| 2018/0164531 A1* | 6/2018 | Wei | G02B 7/021 |
| 2018/0246256 A1* | 8/2018 | Abe | G02B 1/118 |
| 2019/0250312 A1* | 8/2019 | Moon | G03B 37/04 |

\* cited by examiner

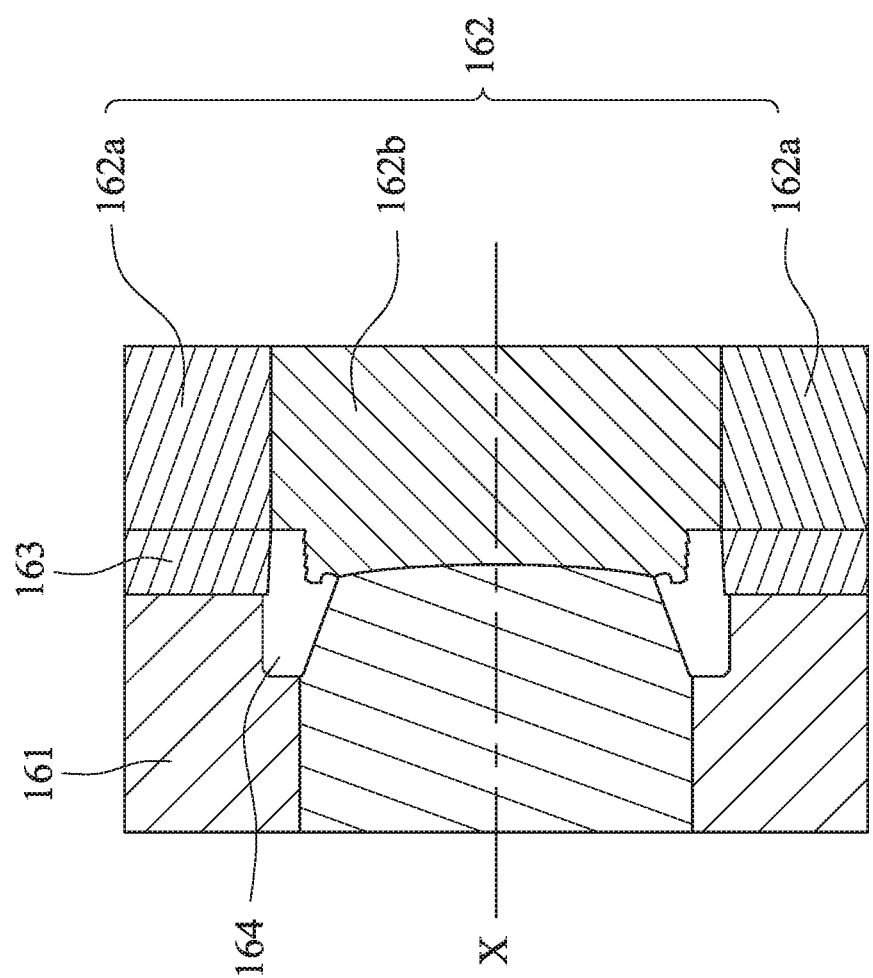

OPTICAL LENS ASSEMBLY AND ELECTRONIC DEVICE

RELATED APPLICATIONS

This application claims priority to Taiwan Application Serial Number 108109634, filed Mar. 20, 2019, which is herein incorporated by reference.

BACKGROUND

Technical Field

The present disclosure relates to an optical lens assembly. More particularly, the present disclosure relates to an optical lens assembly applicable to a portable electronic device.

Description of Related Art

In recent years, the portable electronic devices have developed rapidly, such as smart electronic devices and tablet computers, and have been filled with the lives of modern people. The camera modules mounted on the portable electronic devices are also flourished. However, with the advance of technology, the quality requirements of the camera modules are getting higher and higher. Therefore, in addition to improve the quality of the optical design of the camera modules, the precision of manufacturing of the camera modules also needs to be improved.

SUMMARY

According to one aspect of the present disclosure, an optical lens assembly has a central axis, and includes at least one dual molded lens element. The dual molded lens element includes a light transmitting portion and a light absorbing portion. The light transmitting portion includes an optical effective region and a lens peripheral region, the lens peripheral region surrounds the optical effective region. The light absorbing portion surrounds the optical effective region. The light transmitting portion and the light absorbing portion are made of different plastic materials with different colors, and are integrally formed by an injection molding. The light transmitting portion or the light absorbing portion includes a plurality of annular convex structures. Each of the annular convex structures surrounds the central axis, wherein a cross section of each of the annular convex structures passing through the central axis includes a peak point and two valley points. The peak point is a closest point to the central axis of each of the annular convex structures. Projecting positions of the valley points on the central axis are located on two sides of a projecting position of the peak point on the central axis. The projecting position of the peak point on the central axis does not overlap with each of the projecting positions of the valley points on the central axis. The projecting positions of the annular convex structures perpendicular to the central axis overlap with a projecting position of the light transmitting portion perpendicular to the central axis.

According to another aspect of the present disclosure, an electronic device includes a camera module. The camera module includes the aforementioned optical lens assembly and an image sensor disposed on an image surface of the optical lens assembly.

According to another aspect of the present disclosure, an electronic device includes at least two camera modules facing to a same side, wherein at least one of the camera modules includes the aforementioned optical lens assembly and an image sensor disposed on an image surface of the optical lens assembly.

BRIEF DESCRIPTION OF THE DRAWINGS

The present disclosure can be more fully understood by reading the following detailed description of the embodiment, with reference made to the accompanying drawings as follows:

FIG. 1D is a schematic view of a mold of the first injection molding of the dual molded lens element of FIG. 1C.

DETAILED DESCRIPTION

Figure 1A:
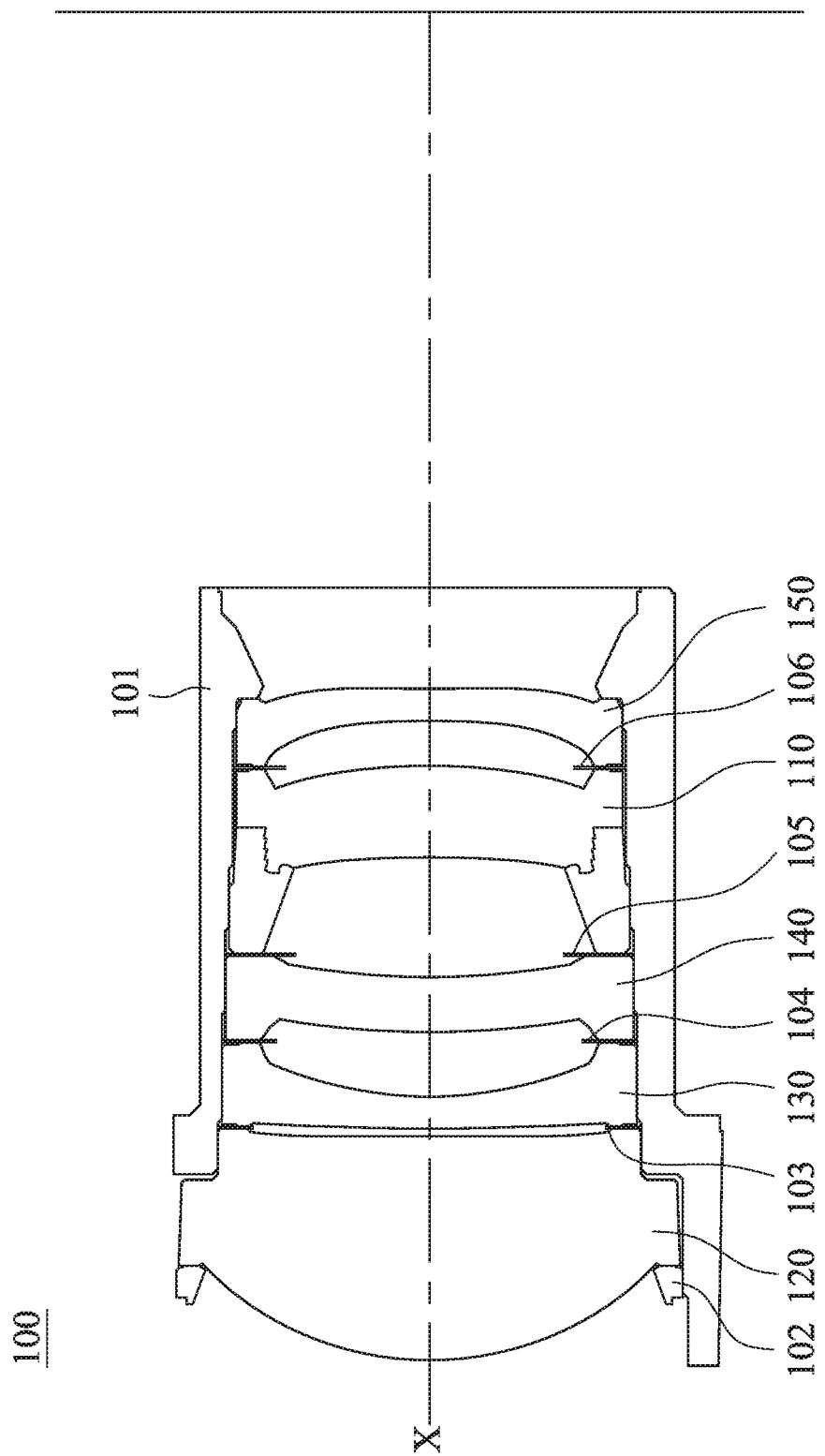
FIG. 1A is a schematic view of an optical lens assembly according to the 1st embodiment of the present disclosure.

The present disclosure provides an optical lens assembly having a central axis and including at least one dual molded lens element. The dual molded lens element includes a light transmitting portion and a light absorbing portion, wherein the light transmitting portion includes an optical effective region and a lens peripheral region, the lens peripheral region surrounds the optical effective region. The light absorbing portion is located at least one surface of object side and image side and surrounds the optical effective region. The light transmitting portion and the light absorbing portion are made of different plastic materials with different colors, and are integrally formed by an injection molding. The light transmitting portion or the light absorbing portion includes a plurality of annular convex structures. Each of the annular convex structures surrounds the central axis, wherein a cross section of each of the annular convex structures passing through the central axis includes a peak point and two valley points. The peak point is a closest point to the central axis of each of the annular convex structures. Projecting positions of the two valley points on the central axis are located on two sides of a projecting position of the peak point on the central axis. The projecting position of the peak point on the central axis does not overlap with each of the projecting positions of the valley points on the central axis. The projecting positions of the annular convex structures perpendicular to the central axis overlap with a projecting position of the light transmitting portion perpendicular to the central axis. Therefore, the tight engagement of the light transmitting portion and the light absorbing portion can be enhanced via the structure of the annular convex structures. The design of the structure of each annular convex structure with the projecting position of the peak point on the central axis which does not overlap with each of the projecting positions of the valley points on the central axis, so that the light absorbing portion can obtain the elastic releasing characteristic, which is different from the releasing angle required for general releasing. Furthermore, the annular convex structures can effectively block the reflected stray light inside the light transmitting portion.

It should be mentioned that, the term "optical effective region" indicates a region which the imaging light passes through. The optical effective region can be a planar surface, a surface with refractive power or being aspheric, wherein the imaging properties would be affected by blocking the optical effective region. The term "dual molded" indicates the dual molded lens element is made by a dual-shot injection molding method or a dual molding method, but the present disclosure is not limited thereto. The light absorbing portion is an area where the visible light cannot pass, and it may be a black material.

The light absorbing portion and the light transmitting portion of the dual molded lens element can be made by a dual-shot injection molding. With the better size accuracy of the molds, the tolerance of the light transmitting portion and the light absorbing portion can be reduced more easily by the dual-shot injection molding method than the traditional assembly method.

The projecting positions of at least one of the annular convex structures on the central axis overlaps with the projecting position of the optical effective region on the central axis. Therefore, the annular convex structures can be closer to the optical effective region, and it is favorable for effectively blocking the reflected light path from an interior of the light transmitting portion, so as to greatly reduce the surface reflection of the interior of the lens element.

A number of the annular convex structures can be at least three. Hence, it is favorable for enhancing the efficiency of blocking the unnecessary light and reducing the design difficulty of the elastic releasing structure.

Distances between each of the projecting positions of the valley points on the central axis and the projecting position of the peak point on the central axis are different. Therefore, it is favorable for achieving the balance between reducing the unnecessary light and the difficulty of releasing. The valley point being closer to the peak point can provide better effect of reducing reflection, and the valley point being farther to the peak point can provide better quality of the injection molding of the light absorbing portion.

The two valley points are a first valley point and a second valley point, respectively. A distance between a projecting position of the first valley point on the central axis and the projecting position of the peak point on the central axis is greater than a distance between a projecting position of the second valley point on the central axis and the projecting position of the peak point on the central axis. Therefore, the elastic releasing structure can obtain more sufficient elasticity, and can endure a temporary deformation from a shape of original design during the releasing step.

When the distance between the projecting position of the first valley point on the central axis and the projecting position of the peak point on the central axis is DG1, and the distance between the projecting position of the second valley point on the central axis and the projecting position of the peak point on the central axis is DG2, the following condition can be satisfied: $1.1<DG1/DG2<25.0$. Therefore, it is favorable for achieving the balance between the depth of the light trap and the difficulty of releasing by the different distance ratios. Further, the following condition can be satisfied: $1.1<DG1/DG2<17.0$.

Each of the annular convex structures has a smooth surface. Therefore, it is favorable for reducing the additional processing steps and enhancing the speed of the production.

The optical lens assembly can further include a plurality of optical elements. The dual molded lens element can further include at least one axial connecting structure disposed on at least one of the light absorbing portion and the light transmitting portion. The axial connecting structure includes an axial connecting surface and at least one receiving surface, the receiving surface is farther from the optical effective region than the axial connecting surface is therefrom. The axial connecting surface is for aligning the dual molded lens element with at least one of the optical elements which is adjacent thereto. The annular convex structure can ensure that the light transmitting portion is tightly engaged with the light absorbing portion, and the arrangement of the axial connecting structure is favorable for further aligning with the optical element which is adjacent thereto so as to increase the coaxiality of the optical elements.

When an angle between the axial connecting surface and the receiving surface is $\alpha$, the following condition can be satisfied: $95$ degrees$<\alpha<135$ degrees. Therefore, it is favorable for avoiding the damage of the lens elements due to the excessive force during the assembly process.

The axial connecting structure is disposed on at least the light absorbing portion. Therefore, it is favorable for improving the unnecessary flare caused by the penetration of the stray light which often occurs in the axial connecting structure, that is, the stray light would be blocked by the light absorbing portion when the stray light passes through the axial connecting surface with the smooth surface.

The axial connecting structure is aligned with at least two of the optical elements which are adjacent thereto. Therefore, it is favorable for effectively reducing the size of the optical lens assembly so as to finish the precise requirements of alignment in a limited space.

Each of the aforementioned features of the optical lens assembly can be utilized in various combinations for achieving the corresponding effects.

The present disclosure provides an electronic device including a camera module. The camera module includes the aforementioned optical lens assembly and an image sensor, and the image sensor is disposed on an image surface of the optical lens assembly. Hence, the electronic device with miniaturization and better image quality can be provided.

The present disclosure further provides an electronic device including at least two camera modules facing to a same side. At least one of the camera modules includes the aforementioned optical lens assembly and an image sensor.

The image sensor is disposed on an image surface of the optical lens assembly. Therefore, the image quality and the range of application can be enhanced while achieving the goal of miniaturization.

1st Embodiment

FIG. 1A is a schematic view of an optical lens assembly 100 according to the 1st embodiment of the present disclosure. In FIG. 1A, the optical lens assembly 100 has a central axis X, and includes a lens barrel 101, a dual molded lens element 110 and a plurality of optical elements 102, 120, 103, 130, 104, 140, 105, 106, 150, wherein the dual molded lens element 110 and the optical elements 103, 130, 104, 140, 105, 106, 150 are disposed in the lens barrel 101. The optical element 120 is partially connected to the lens barrel 101.

Figure 1B:
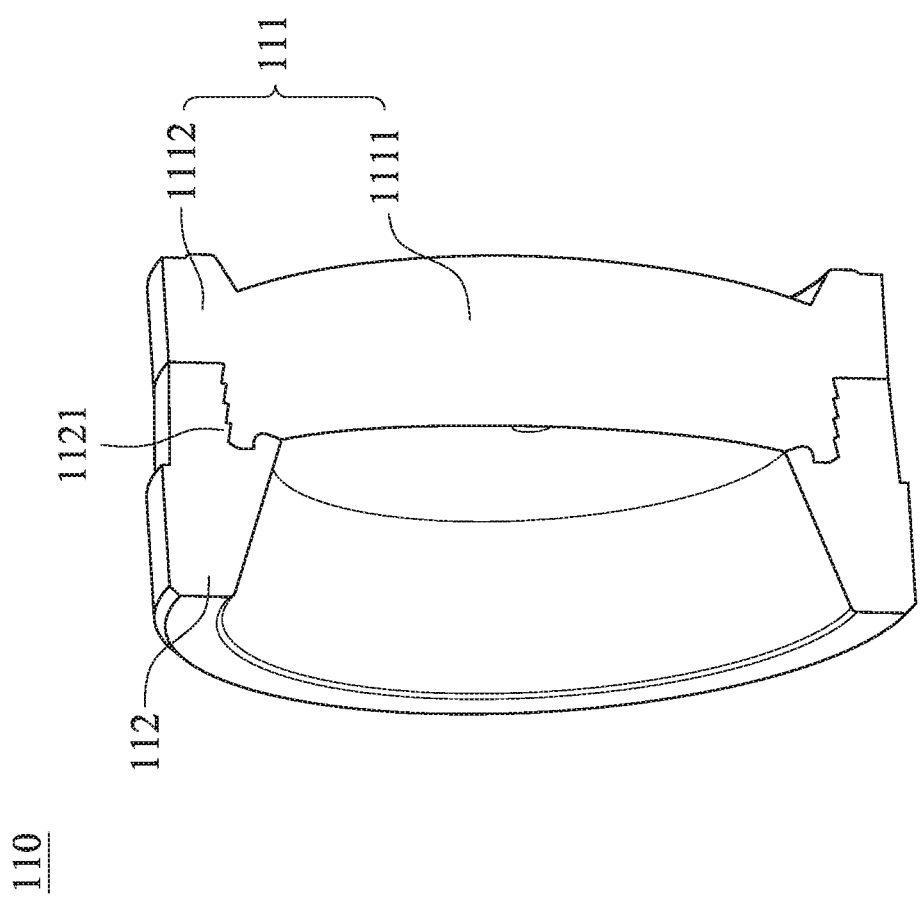
FIG. 1B is a three-dimensional-sectional view of the dual molded lens element of FIG. 1A.
Figure 1C:
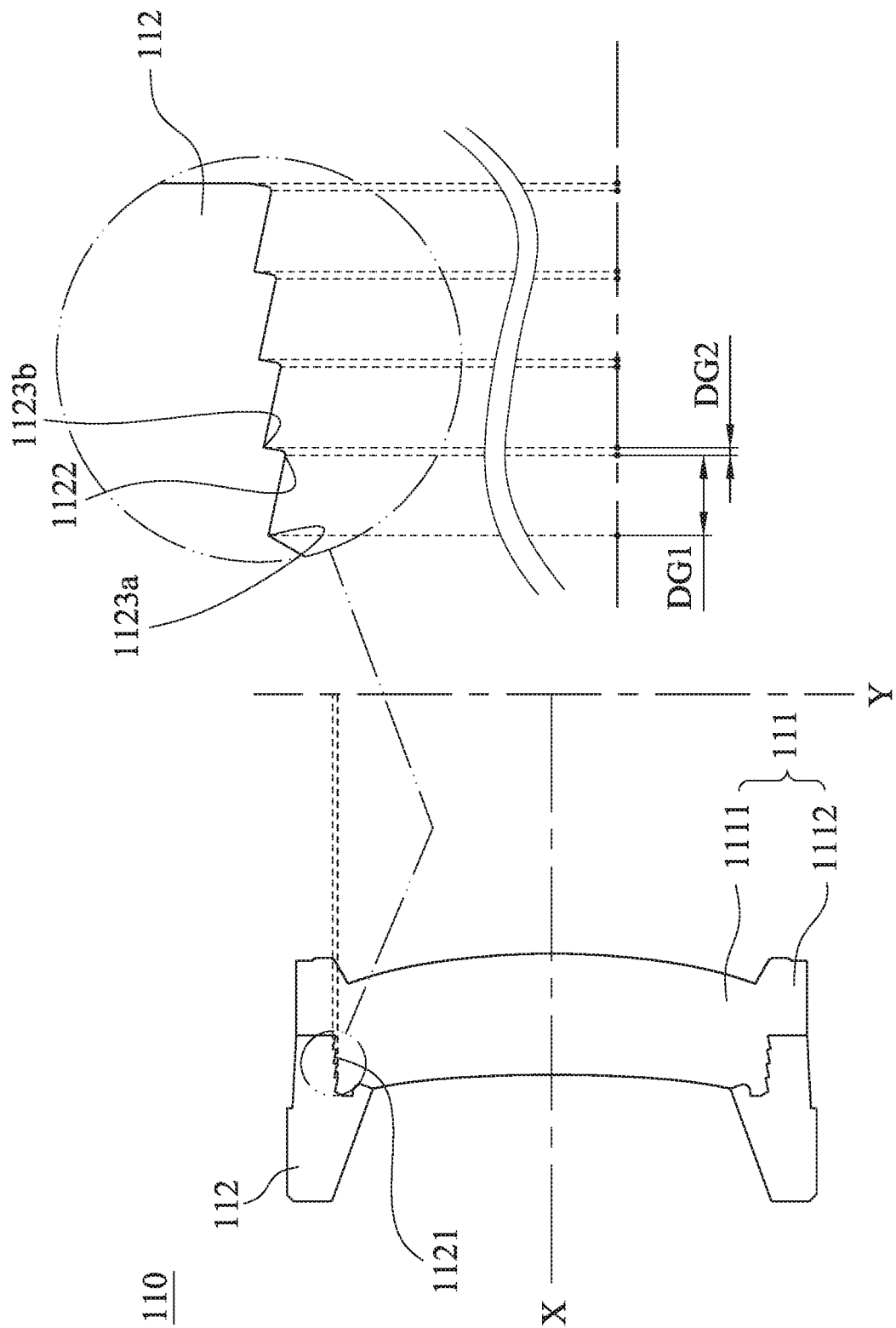
FIG. 1C is a plane-sectional view of the dual molded lens element of FIG. 1A.

FIG. 1B is a three-dimensional-sectional view of the dual molded lens element 110 of FIG. 1A. FIG. 1C is a plane-sectional view of the dual molded lens element 110 of FIG. 1A. In FIGS. 1A, 1B and 1C, the dual molded lens element 110 includes a light transmitting portion 111 and a light absorbing portion 112. The light transmitting portion 111 includes an optical effective region 1111 and a lens peripheral region 1112, wherein the lens peripheral region 1112 surrounds the optical effective region 1111. The light absorbing portion 112 surrounds the optical effective region 1111. The light transmitting portion 111 and the light absorbing portion 112 are made of different plastic materials with different colors, and are integrally formed by the injection molding. In the 1st embodiment, the light absorbing portion 112 and the light transmitting portion 111 of the dual molded lens element 110 are made by the dual-shot injection molding.

In FIG. 1C, the light absorbing portion 112 includes a plurality of annular convex structures 1121. Each of the annular convex structures 1121 surrounds the central axis X. The number of the annular convex structures 1121 is at least three, and in the 1st embodiment, the number of the annular convex structures 1121 is four. Each of the annular convex structures 1121 has a smooth surface. The projecting positions of the annular convex structures 1121 on the central axis X overlap with a projecting position of the light transmitting portion 111 on the central axis X.

In FIG. 1C, a cross section of each of the annular convex structures 1121 passing through the central axis X includes a peak point 1122 and two valley points (which are 1123a and 1123b in FIG. 1C). The peak point 1122 is a closest point to the central axis X of each of the annular convex structures 1121. Projecting positions of two valley points on the central axis X are located on two sides of a projecting position of the peak point 1122 on the central axis X. The projecting position of the peak point 1122 on the central axis X does not overlap with each of the projecting positions of each of the valley points on the central axis X.

Distances between each of the projecting positions of the valley points on the central axis X and the projecting position of the peak point 1122 on the central axis X are different. In the 1st embodiment, the two valley points of each annular convex structure 1121 are a first valley point 1123a and a second valley point 1123b, respectively. A distance between a projecting position of the first valley point 1123a on the central axis X and the projecting position of the peak point 1122 on the central axis X is greater than a distance between a projecting position of the second valley point 1123b on the central axis X and the projecting position of the peak point 1122 on the central axis X.

As shown in FIG. 1C, when the distance between the projecting position of the first valley point 1123a on the central axis X and the projecting position of the peak point 1122 on the central axis X is DG1, the distance between the projecting position of the second valley point 1123b on the central axis X and the projecting position of the peak point 1122 on the central axis X is DG2, the following condition of Table 1 can be satisfied.

TABLE 1

| 1st embodiment, | | | |
|---|---|---|---|
| DG1 (mm) | 0.0915 | DG1/DG2 | 10.765 |
| DG2 (mm) | 0.0085 | | |

Figure 1E:
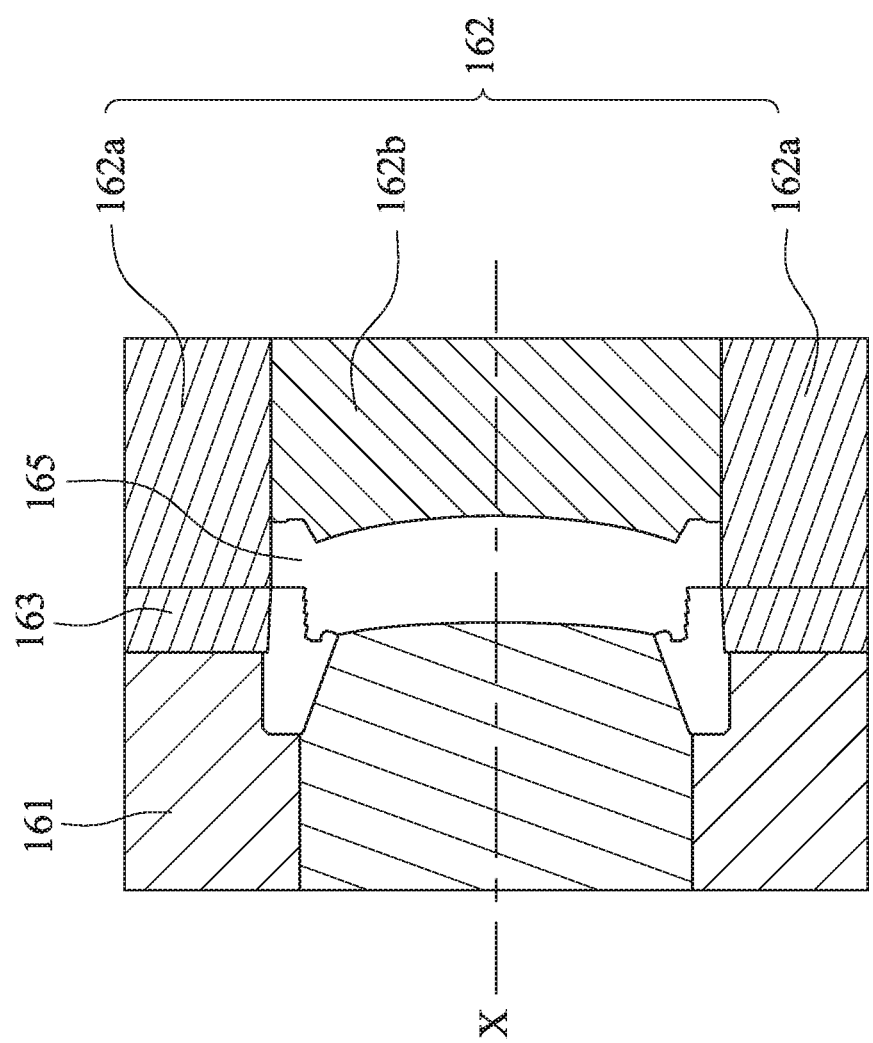
FIG. 1E is a schematic view of a mold of the second injection molding of the dual molded lens element of FIG. 1C.

Further, FIG. 1D is a schematic view of a mold of the first injection molding of the dual molded lens element 110 of FIG. 1C, FIG. 1E is a schematic view of a mold of the second injection molding of the dual molded lens element 110 of FIG. 1C. In the 1st embodiment, the light absorbing portion 112 and the light transmitting portion 111 of the dual molded lens element 110 are made by a dual-shot injection molding. As shown in FIG. 1D and FIG. 1E, the mold includes a fixed side 161, a movable side 162 and a sliding block 163. The sliding block 163 is located between the fixed side 161 and the movable side 162. The movable side 162 further includes two positioning molds 162a and an adjustable mold 162b. In FIG. 1D, the light absorbing portion 112 can be formed in a molded-injecting space 164 first. In FIG. 1E, the light transmitting portion 111 can be formed in a molded-injecting space 165 by moving the adjustable mold 162b of the movable side 162 along the direction of the central axis X, so as to finish the dual-shot injection molding of the dual molded lens element 110. The movable side 162 and the sliding block 163 are both the movable molding members in the process of the dual-shot injection molding, and the moving direction of the sliding block 163 can be different from the moving direction of the movable side 162. As shown in FIG. 1D and FIG. 1E, the movable side 162 is moved along a direction parallel to the central axis X, and the sliding block 163 is moved along a direction perpendicular to the central axis X, but the present disclosure is not limited thereto.

The manufacturing molding method of the dual molded lens element in the following embodiments are the same as the manufacturing molding method mentioned in the 1st embodiment, and which will not be described herein.

2nd Embodiment

Figure 2A:
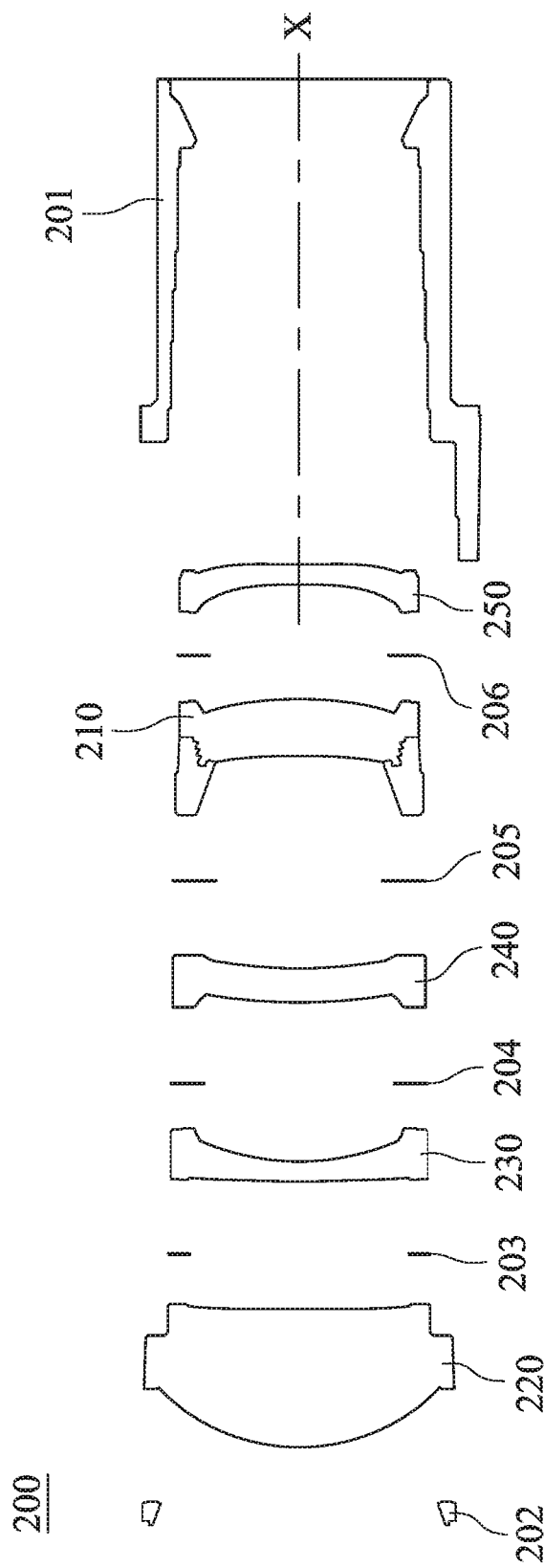
FIG. 2A is an explored schematic view of an optical lens assembly according to the 2nd embodiment of the present disclosure.

FIG. 2A is an explored schematic view of an optical lens assembly 200 according to the 2nd embodiment of the present disclosure. As shown in FIG. 2A, the optical lens assembly 200 has a central axis X, and includes a lens barrel 201, a dual molded lens element 210 and a plurality of optical elements 202, 220, 203, 230, 204, 240, 205, 206, 250, wherein the dual molded lens element 210 and the optical elements 203, 230, 204, 240, 205, 206, 250 are disposed in the lens barrel 201. The optical element 220 is partially connected to the lens barrel 201.

Figure 2B:
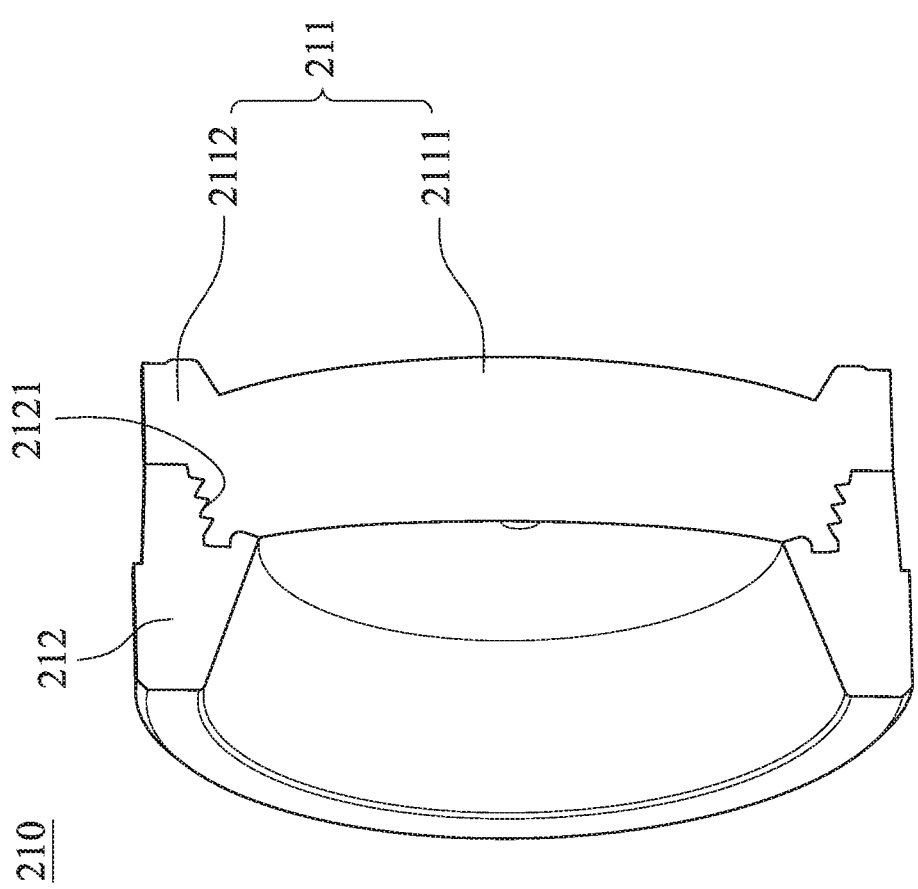
FIG. 2B is a three-dimensional-sectional view of the dual molded lens element of FIG. 2A.
Figure 2C:
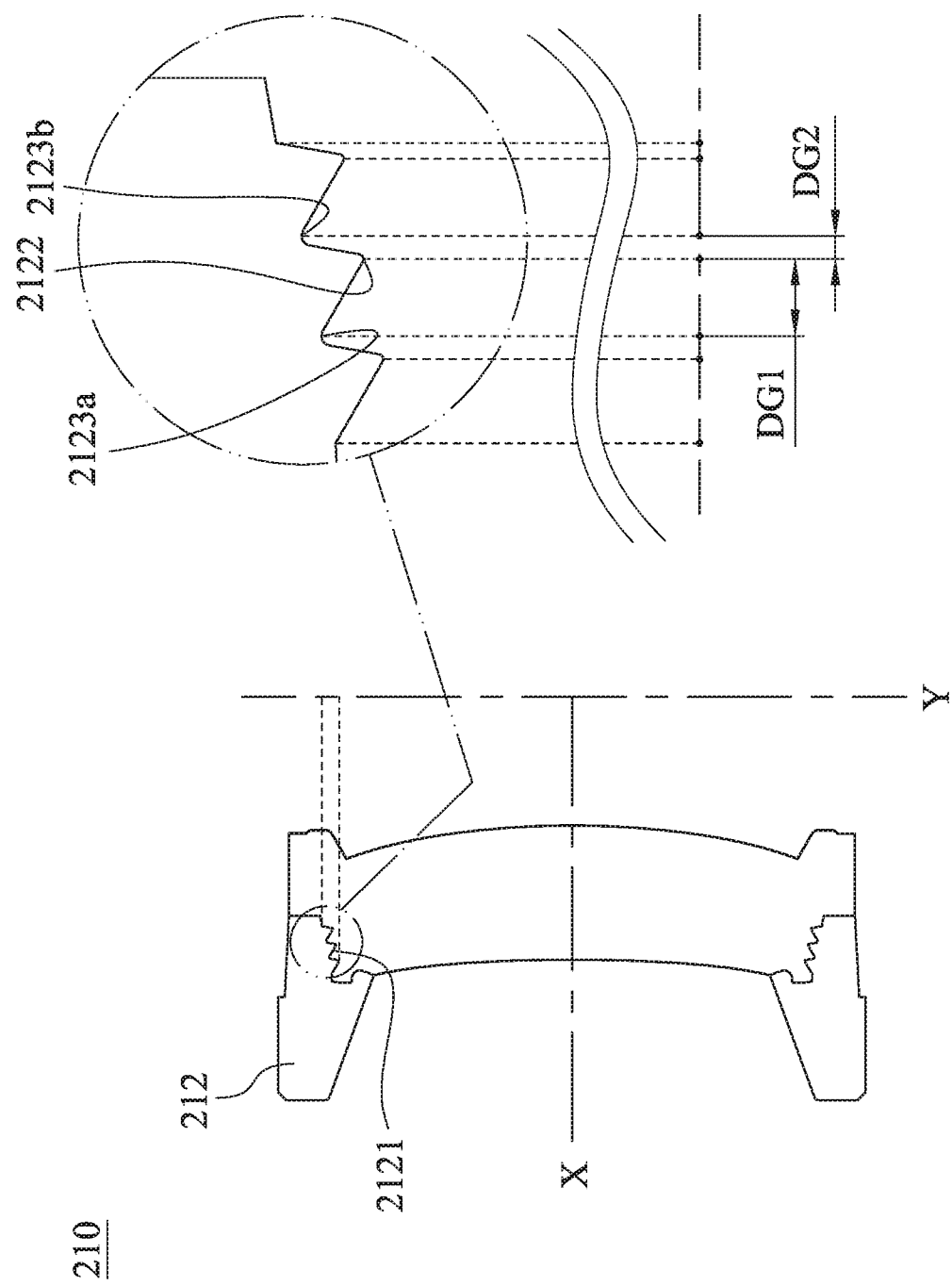
FIG. 2C is a plane-sectional view of the dual molded lens element of FIG. 2A.

FIG. 2B is a three-dimensional-sectional view of the dual molded lens element 210 of FIG. 2A. FIG. 2C is a plane-sectional view of the dual molded lens element 210 of FIG. 2A. In FIGS. 2A, 2B and 2C, the dual molded lens element 210 includes a light transmitting portion 211 and a light absorbing portion 212. The light transmitting portion 211 includes an optical effective region 2111 and a lens peripheral region 2112, wherein the lens peripheral region 2112 surrounds the optical effective region 2111. The light absorbing portion 212 surrounds the optical effective region 2111. The light transmitting portion 211 and the light absorbing portion 212 are made of different plastic materials with different colors, and are integrally formed by the injection molding. In the 2nd embodiment, the light absorbing portion 212 and the light transmitting portion 211 of the dual molded lens element 210 are made by the dual-shot injection molding.

In FIG. 2C, the light absorbing portion 212 includes a plurality of annular convex structures 2121. Each of the annular convex structures 2121 surrounds the central axis X. The number of the annular convex structures 2121 is at least three, and in the 2nd embodiment, the number of the annular convex structures 2121 is three. Each of the annular convex structures 2121 has a smooth surface. The projecting positions of the annular convex structures 2121 on the central axis X overlap with a projecting position of the light transmitting portion 211 on the central axis X.

In FIG. 2C, a cross section of each of the annular convex structures 2121 passing through the central axis X includes a peak point 2122 and two valley points (which are 2123a and 2123b in FIG. 2C). The peak point 2122 is a closest point to the central axis X of each of the annular convex structures 2121. Projecting positions of two valley points on the central axis X are located on two sides of a projecting position of the peak point 2122 on the central axis X. The projecting position of the peak point 2122 on the central axis X does not overlap with each of the projecting positions of each of the valley points on the central axis X.

Distances between each of the projecting positions of the valley points on the central axis X and the projecting position of the peak point 2122 on the central axis X are different. In the 2nd embodiment, the two valley points of each annular convex structure 2121 are a first valley point 2123a and a second valley point 2123b, respectively. A distance between a projecting position of the first valley point 2123a on the central axis X and the projecting position of the peak point 2122 on the central axis X is greater than a distance between a projecting position of the second valley point 2123b on the central axis X and the projecting position of the peak point 2122 on the central axis X.

As shown in FIG. 2C, when the distance between the projecting position of the first valley point 2123a on the central axis X and the projecting position of the peak point 2122 on the central axis X is DG1, the distance between the projecting position of the second valley point 2123b on the central axis X and the projecting position of the peak point 2122 on the central axis X is DG2, the following condition of Table 2 can be satisfied.

TABLE 2

| 2nd embodiment | | | |
|---|---|---|---|
| DG1 (mm) | 0.0862 | DG1/DG2 | 3.622 |
| DG2 (mm) | 0.0238 | | |

3rd Embodiment

Figure 3A:
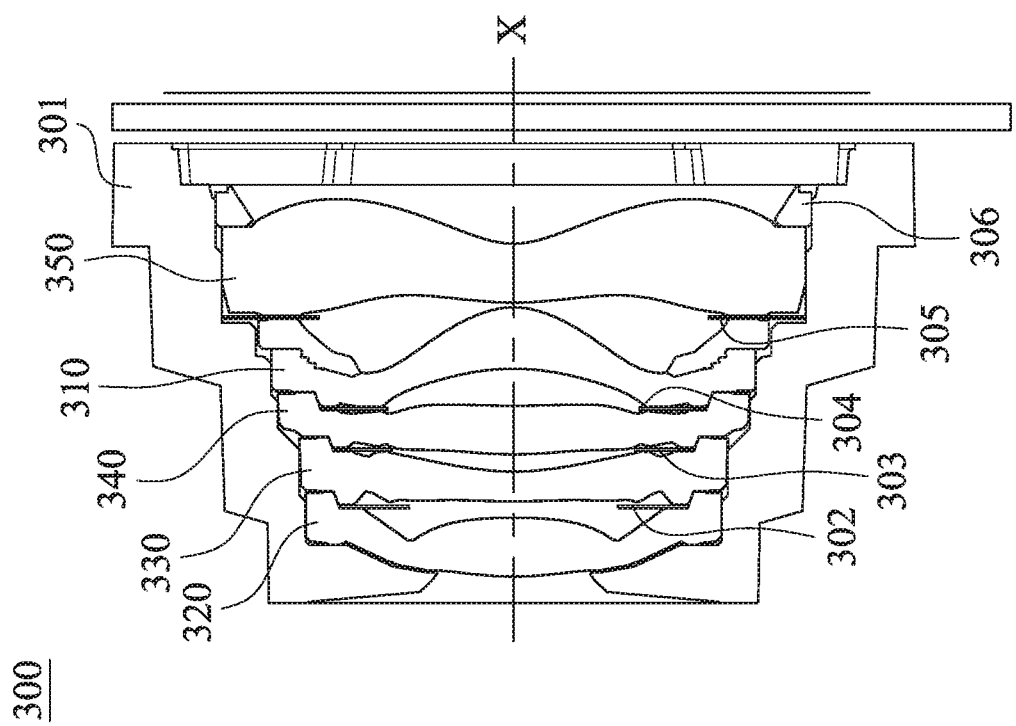
FIG. 3A is a schematic view of an optical lens assembly according to the 3rd embodiment of the present disclosure.

FIG. 3A is a schematic view of an optical lens assembly 300 according to the 3rd embodiment of the present disclosure. In FIG. 3A, the optical lens assembly 300 has a central axis X, and includes a lens barrel 301, a dual molded lens element 310 and a plurality of optical elements 320, 302, 330, 303, 340, 304, 305, 350, 306, wherein the dual molded lens element 310 and the optical elements 320, 302, 330, 303, 340, 304, 305, 350, 306 are disposed in the lens barrel 301.

Figure 3B:
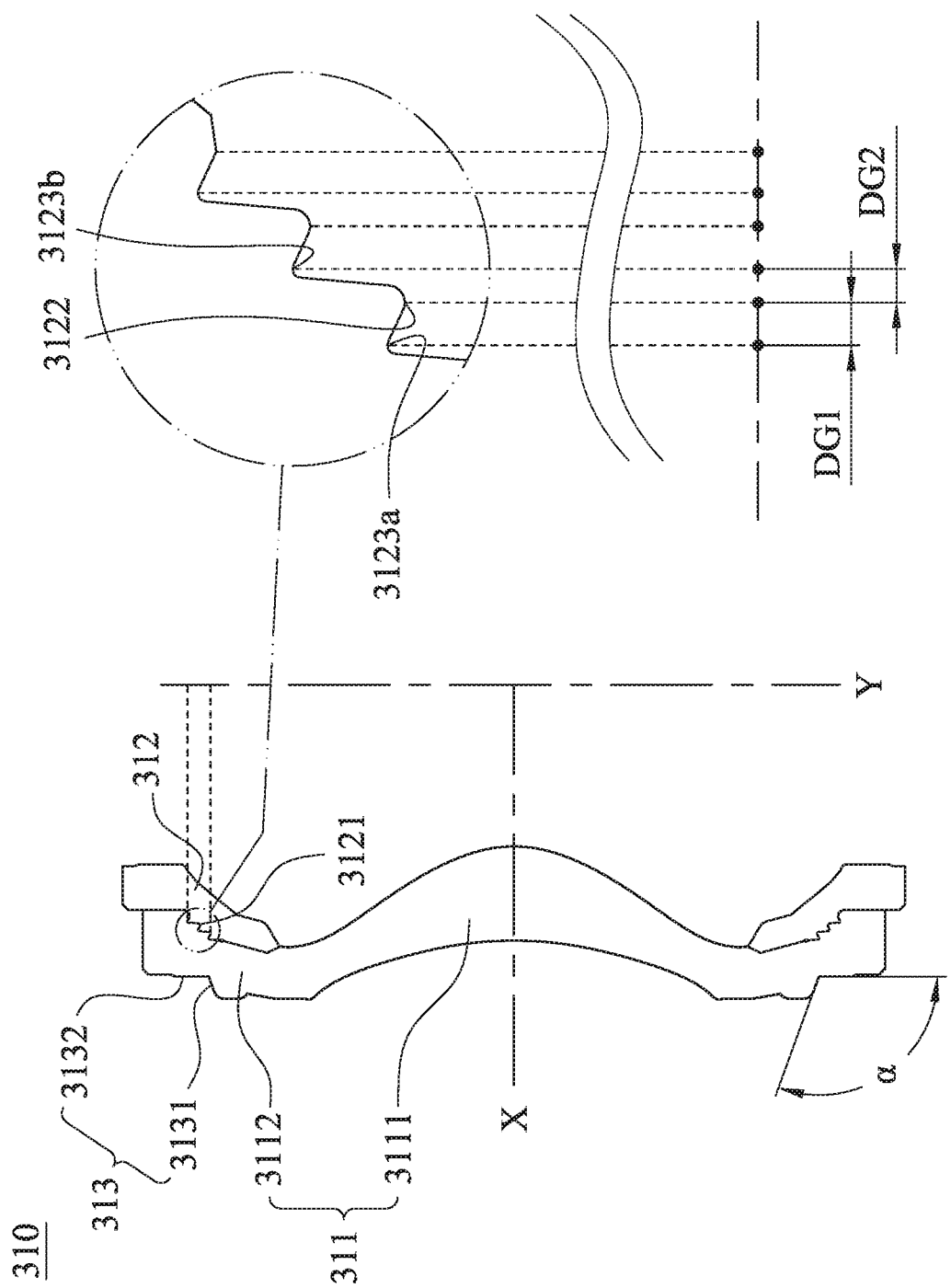
FIG. 3B is a plane-sectional view of the dual molded lens element of FIG. 3A.

FIG. 3B is a plane-sectional view of the dual molded lens element 310 of FIG. 3A. As shown in FIG. 3A and FIG. 3B, the dual molded lens element 310 includes a light transmitting portion 311 and a light absorbing portion 312. The light transmitting portion 311 includes an optical effective region 3111 and a lens peripheral region 3112, wherein the lens peripheral region 3112 surrounds the optical effective region 3111. The light absorbing portion 312 surrounds the optical effective region 3111. The light transmitting portion 311 and the light absorbing portion 312 are made of different plastic materials with different colors, and are integrally formed by the injection molding. In the 3rd embodiment, the light absorbing portion 312 and the light transmitting portion 311 of the dual molded lens element 310 are made by the dual-shot injection molding.

In FIG. 3B, the light transmitting portion 311 includes a plurality of annular convex structures 3121. Each of the annular convex structures 3121 surrounds the central axis X. In the 3rd embodiment, the number of the annular convex structures 3121 is two. Each of the annular convex structures 3121 has a smooth surface. The projecting positions of the annular convex structures 3121 on the central axis X overlap with a projecting position of the light transmitting portion 311 on the central axis X.

In FIG. 3B, a cross section of each of the annular convex structures 3121 passing through the central axis X includes a peak point 3122 and two valley points (which are 3123a and 3123b in FIG. 3B). The peak point 3122 is a closest point to the central axis X of each of the annular convex structures 3121. Projecting positions of two valley points on the central axis X are located on two sides of a projecting position of the peak point 3122 on the central axis X. The projecting position of the peak point 3122 on the central axis X does not overlap with each of the projecting positions of each of the valley points on the central axis X.

Distances between each of the projecting positions of the valley points on the central axis X and the projecting position of the peak point 3122 on the central axis X are different. In the 3rd embodiment, the two valley points of each annular convex structure 3121 are a first valley point 3123a and a second valley point 3123b, respectively. A distance between a projecting position of the first valley point 3123a on the central axis X and the projecting position of the peak point 3122 on the central axis X is greater than a distance between a projecting position of the second valley point 3123b on the central axis X and the projecting position of the peak point 3122 on the central axis X.

Furthermore, as shown in FIG. 3B, the dual molded lens element 310 further includes at least one axial connecting structure 313 disposed on at least one of the light absorbing portion 312 and the light transmitting portion 311. In the 3rd embodiment, the number of the axial connecting structure 313 is one, and the axial connecting structure 313 is disposed on the light transmitting portion 311 and is located at the object side of the dual molded lens element 310. The axial connecting structure 313 includes an axial connecting surface 3131 and at least one receiving surface 3132, the receiving surface 3132 is farther from the optical effective region 3111 than the axial connecting surface 3131 is therefrom. In the 3rd embodiment, the number of the receiving surface 3132 is one. The axial connecting surface 3131 is for aligning the dual molded lens element 310 with at least one of the optical elements 340 which is adjacent thereto.

As shown in FIG. 3B, when the distance between the projecting position of the first valley point 3123a on the central axis X and the projecting position of the peak point 3122 on the central axis X is DG1, the distance between the projecting position of the second valley point 3123b on the central axis X and the projecting position of the peak point 3122 on the central axis X is DG2, and an angle between the axial connecting surface 3131 and the receiving surface 3132 is α, the following condition of Table 3 can be satisfied.

TABLE 3

| 3rd embodiment, | | | |
|---|---|---|---|
| DG1 (mm) | 0.025 | DG1/DG2 | 1.282 |
| DG2 (mm) | 0.0195 | α (°) | 110 |

4th Embodiment

Figure 4A:
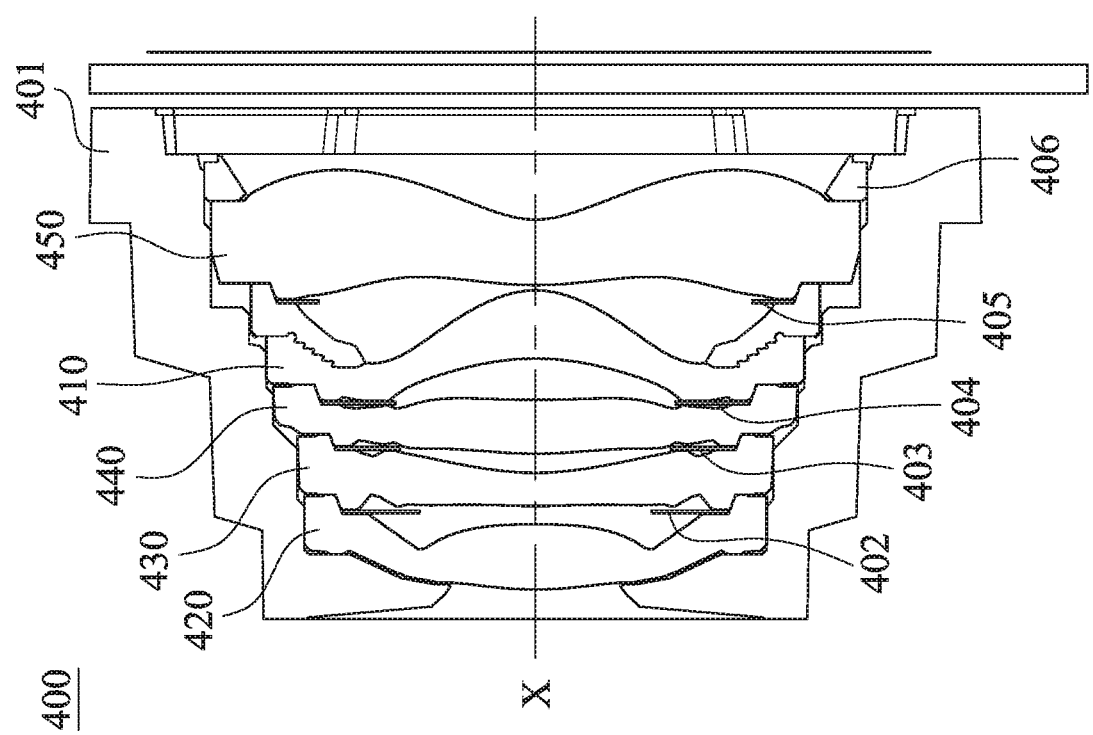
FIG. 4A is a schematic view of an optical lens assembly according to the 4th embodiment of the present disclosure.

FIG. 4A is a schematic view of an optical lens assembly 400 according to the 4th embodiment of the present disclosure. As shown in FIG. 4A, the optical lens assembly 400 has a central axis X, and includes a lens barrel 401, a dual molded lens element 410 and a plurality of optical elements 420, 402, 430, 403, 440, 404, 405, 450, 406, wherein the dual molded lens element 410 and the optical elements 420, 402, 430, 403, 440, 404, 405, 450, 406 are disposed in the lens barrel 401.

Figure 4B:
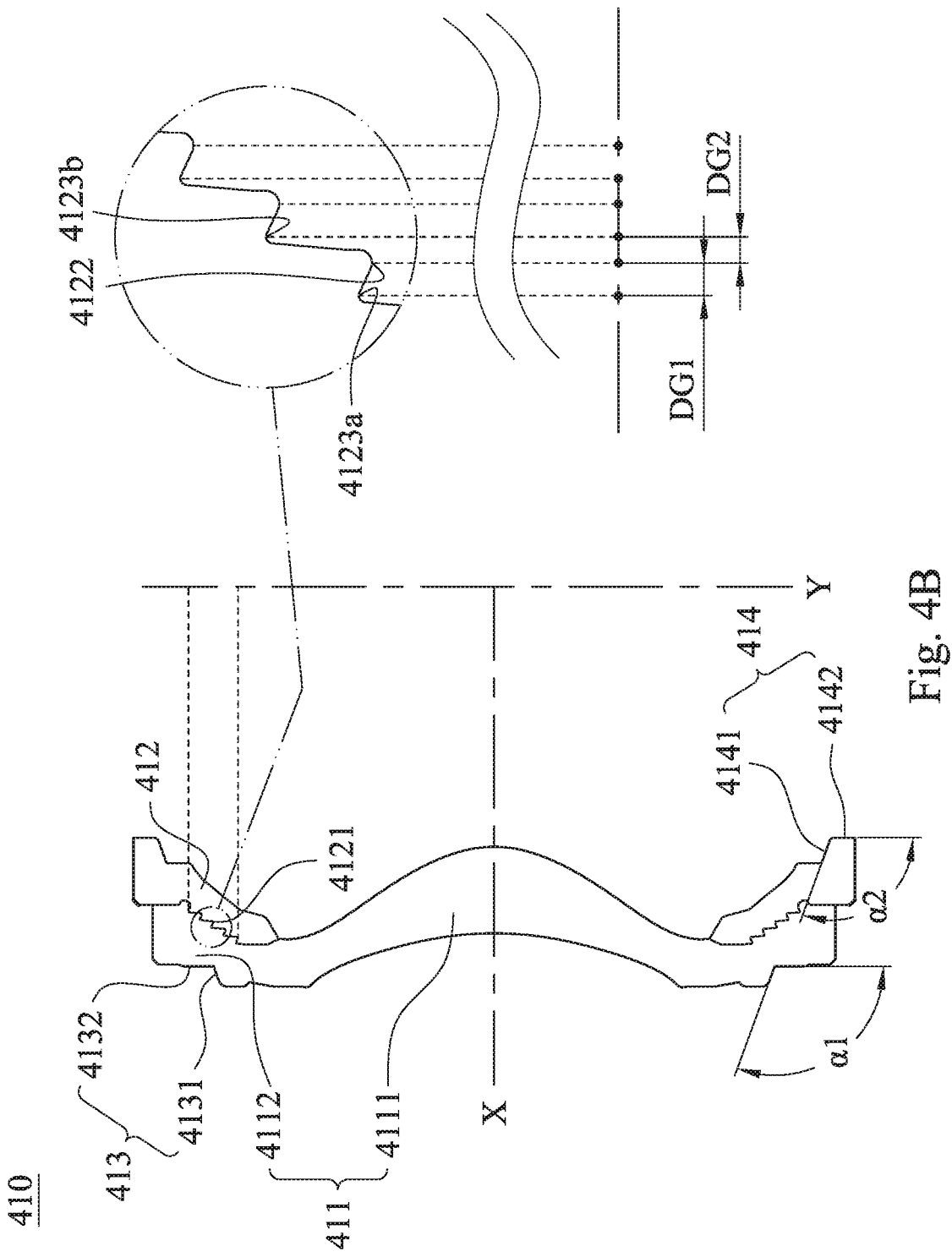
FIG. 4B is a plane-sectional view of the dual molded lens element of FIG. 4A.

FIG. 4B is a plane-sectional view of the dual molded lens element 410 of FIG. 4A. In FIG. 4A and FIG. 4B, the dual molded lens element 410 includes a light transmitting portion 411 and a light absorbing portion 412. The light transmitting portion 411 includes an optical effective region 4111 and a lens peripheral region 4112, wherein the lens peripheral region 4112 surrounds the optical effective region 4111. The light absorbing portion 412 surrounds the optical effective region 4111. The light transmitting portion 411 and the light absorbing portion 412 are made of different plastic materials with different colors, and are integrally formed by the injection molding. In the 4th embodiment, the light absorbing portion 412 and the light transmitting portion 411 of the dual molded lens element 410 are made by the dual-shot injection molding.

In FIG. 4B, the light transmitting portion 411 includes a plurality of annular convex structures 4121. Each of the annular convex structures 4121 surrounds the central axis X. The number of the annular convex structures 4121 is at least three, and in the 4th embodiment, the number of the annular convex structures 4121 is three. Each of the annular convex structures 4121 has a smooth surface. The projecting positions of the annular convex structures 4121 on the central axis X overlap with a projecting position of the light transmitting portion 411 on the central axis X.

In FIG. 4B, a cross section of each of the annular convex structures 4121 passing through the central axis X includes a peak point 4122 and two valley points (which are 4123a and 4123b in FIG. 4B). The peak point 4122 is a closest point to the central axis X of each of the annular convex structures 4121. Projecting positions of two valley points on the central axis X are located on two sides of a projecting position of the peak point 4122 on the central axis X. The projecting position of the peak point 4122 on the central axis X does not overlap with each of the projecting positions of each of the valley points on the central axis X.

Distances between each of the projecting positions of the valley points on the central axis X and the projecting position of the peak point 4122 on the central axis X are different. In the 4th embodiment, the two valley points of each annular convex structure 4121 are a first valley point 4123a and a second valley point 4123b, respectively. A distance between a projecting position of the first valley point 4123a on the central axis X and the projecting position of the peak point 4122 on the central axis X is greater than a distance between a projecting position of the second valley point 4123b on the central axis X and the projecting position of the peak point 4122 on the central axis X.

Furthermore, as shown in FIG. 4B, the dual molded lens element 410 further includes at least one axial connecting structure 413, 414 which are disposed on at least one of the light absorbing portion 412 and the light transmitting portion 411. In the 4th embodiment, the number of the axial connecting structures 413, 414 is two, and the axial connecting structures 413, 414 are disposed on the light transmitting portion 411 and the light absorbing portion 412, respectively, and are located at the object-side surface and the image-side surface of the dual molded lens element 410, respectively. In detail, the axial connecting structures 413 is located at the transmitting portion 411 and includes an axial connecting surface 4131 and at least one receiving surface 4132. The receiving surface 4132 is farther from the optical effective region 4111 than the axial connecting surface 4131 is therefrom. In the 4th embodiment, the number of the receiving surface 4132 is one. The axial connecting surface 4131 is for aligning the dual molded lens element 410 with at least one of the optical elements 440 which is adjacent thereto. The axial connecting structure 414 is located at the light absorbing portion 412 and includes an axial connecting surface 4141 and at least one receiving surface 4142. The receiving surface 4142 is farther from the optical effective region 4111 than the axial connecting surface 4141 is therefrom. In 4th embodiment, the number of the receiving surface 4142 is one. The axial connecting surface 4141 is for aligning the dual molded lens element 410 with the optical elements 405, 450 which are adjacent thereto.

As shown in FIG. 4B, when the distance between the projecting position of the first valley point 4123a on the central axis X and the projecting position of the peak point 4122 on the central axis X is DG1, the distance between the projecting position of the second valley point 4123b on the central axis X and the projecting position of the peak point 4122 on the central axis X is DG2, and an angle between the axial connecting surface 4131 and the receiving surface 4132 is α1, and an angle between the axial connecting surface 4141 and the receiving surface 4142 is α2, the following condition of Table 4 can be satisfied.

TABLE 4

| 4th embodiment, | | | |
|---|---|---|---|
| DG1 (mm) | 0.025 | α 1 (°) | 110 |
| DG2 (mm) | 0.0199 | α 2 (°) | 110 |
| DG1/DG2 | 1.256 | | |

5th Embodiment

Figure 5A:
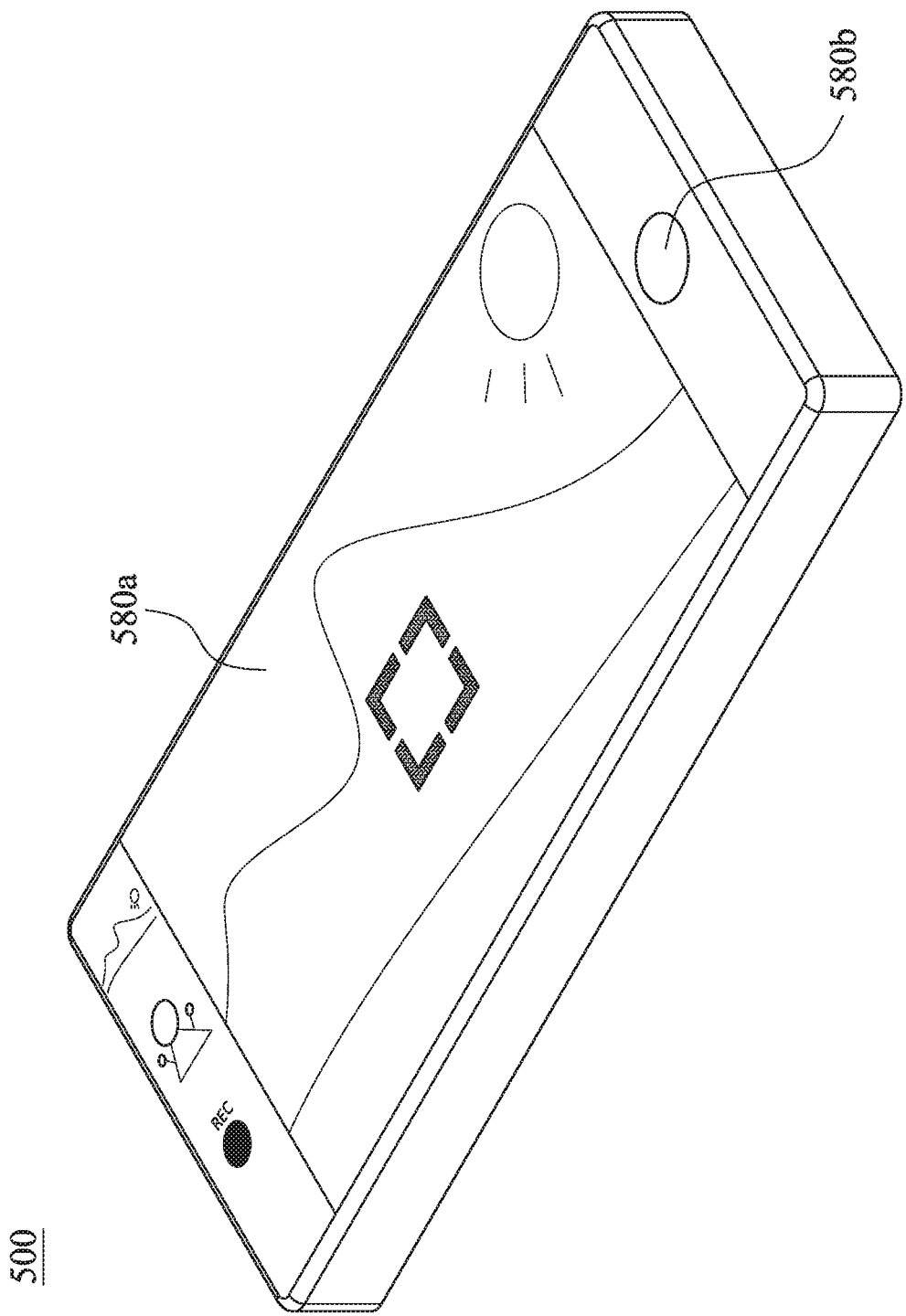
FIG. 5A is a schematic view of an electronic device according to the 5th embodiment of the present disclosure.

FIG. 5A is a schematic view of an electronic device 500 according to the 5th embodiment of the present disclosure.

Figure 5B:
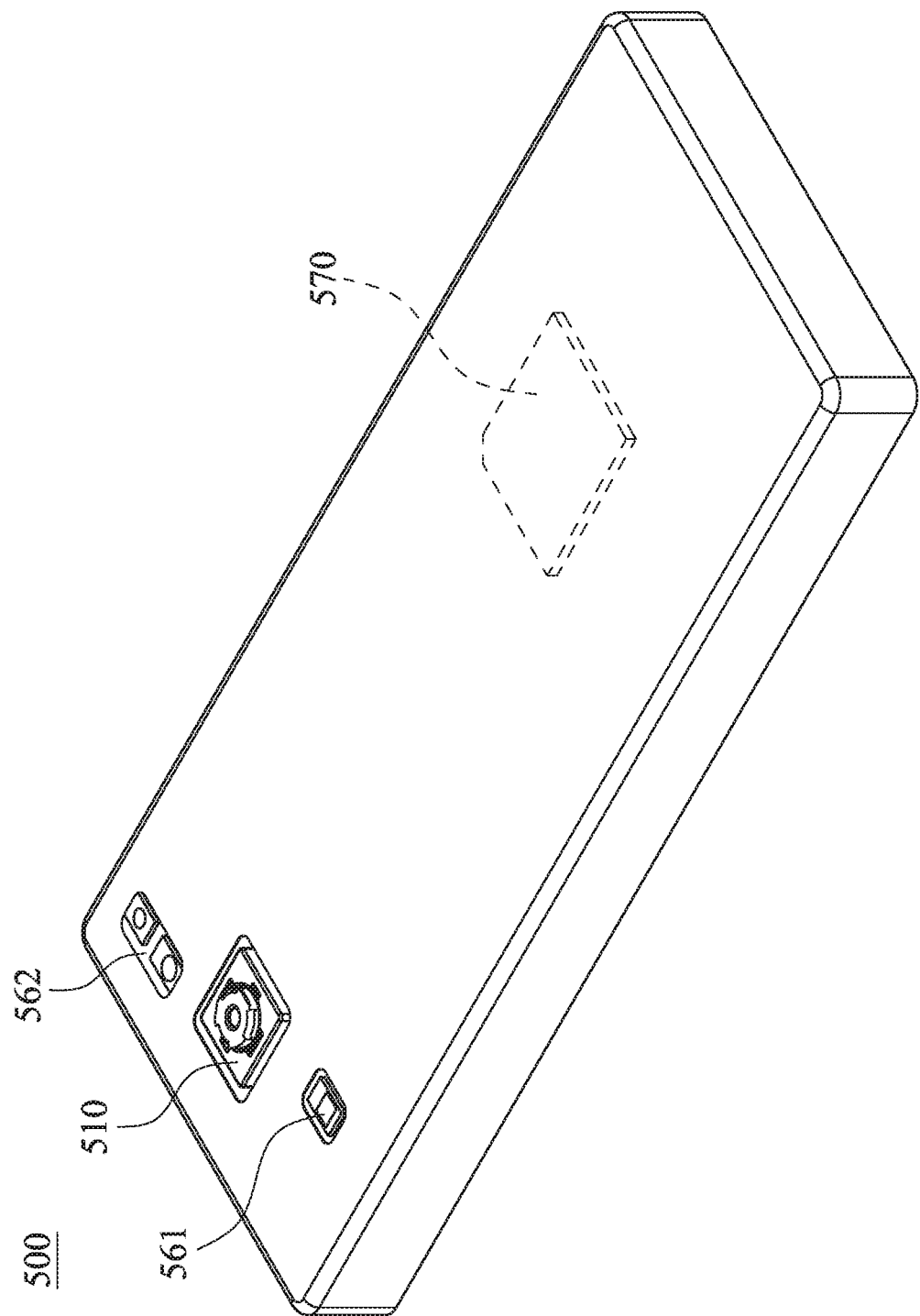
FIG. 5B is another schematic view of the electronic device of FIG. 5A.
Figure 5C:
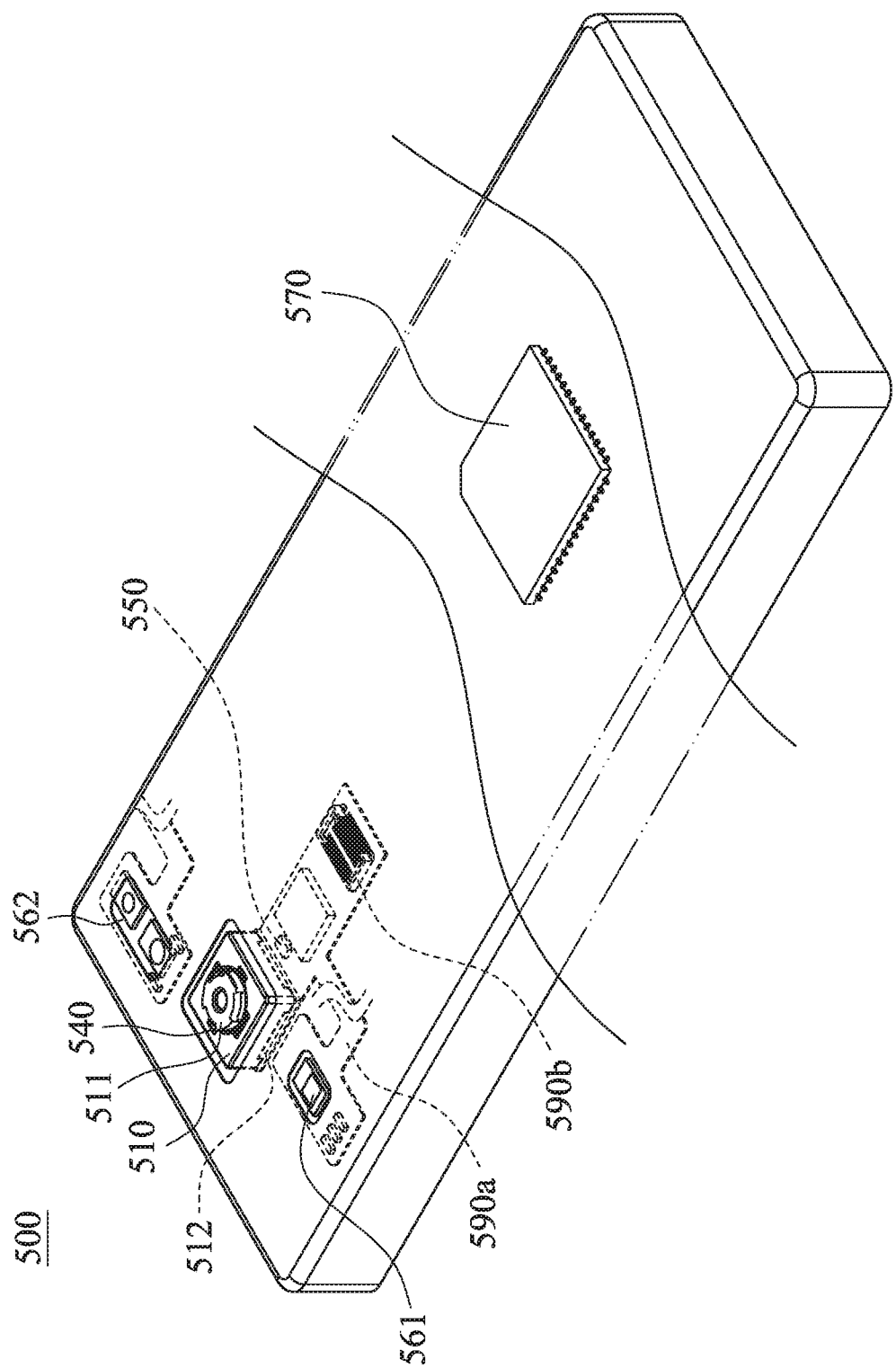
FIG. 5C is a schematic view of the component of the electronic device of FIG. 5A.
Figure 5D:
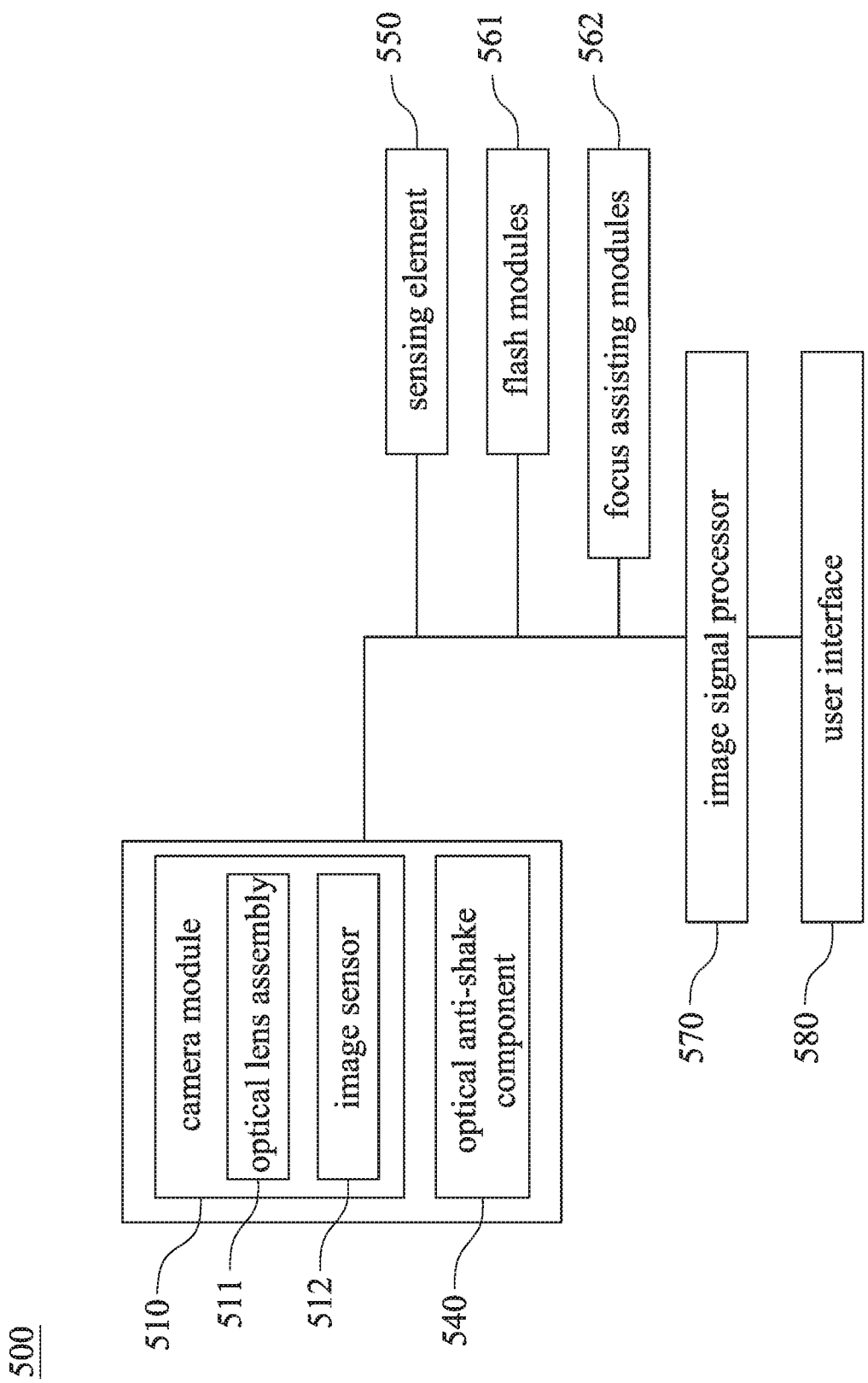
FIG. 5D is a block diagram of the electronic device of FIG. 5A.

FIG. 5B is another schematic view of the electronic device 500 of FIG. 5A. FIG. 5C is a schematic view of the components of the electronic device 500 of FIG. 5A. FIG. 5D is a block diagram of the electronic device 500 of FIG. 5A. In FIGS. 5A, 5B, 5C and 5D, the electronic device 500 of the 5th embodiment is a smartphone. The electronic device 500 includes the camera module 510 according to the present disclosure, wherein the camera module 510 includes the optical lens assembly 511 according to any of the aforementioned embodiments and an image sensor 512, and the image sensor 512 is disposed on the image surface (not shown) of the optical lens assembly 511. Accordingly, the demands of the current electronic device market to the mass productions and the appearances of the camera module can be satisfied.

Specifically, a user activates a capturing mode via the user interface 580 of the electronic device 500, wherein the user interface 580 in the 5th embodiment can be a touch screen 580a and a button 580b, etc. At this time, the optical lens assembly 511 converges the imaging light on the image sensor 512 and outputs the electronic signals associated with the image to the image signal processor (ISP) 570.

The electronic device 500 further includes an optical anti-shake component 540, which can be an OIS anti-shake feedback device, in response to the camera specification of the electronic device 500. Moreover, the electronic device 500 can further include at least one auxiliary optical element (its reference numeral is omitted) and at least one sensing element 550. In the 5th embodiment, the auxiliary optical elements can be the flash modules 561 and the focus assisting modules 562. The flash modules 561 can be for compensating for color temperatures. The focus assisting modules 562 can be infrared distance measurement component and laser focus module, etc. The sensing element 550 can have functions for sensing physical momentum and kinetic energies, such as an accelerator, a gyroscope, and a Hall Effect element, to sense shaking or jitters applied by hands of the user or external environments. As a result, the auto focus function and the optical anti-shake component 540 disposed on the electronic device 500 can function to obtain great imaging qualities and facilitate the electronic device 500 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

Furthermore, in FIG. 5C, the camera module 510, the optical anti-shake component 540, the sensing element 550, the flash modules 561 and the focus assisting modules 562 can be disposed on a flexible printed circuitboard (FPC) 590a, and via a connector 590b to connect the associated elements, such as the image signal processor 570, to perform a capturing process. Since the current electronic devices, such as smartphones, have a tendency of being light and thin, the way of firstly disposing the imaging lens module and related elements on the flexible printed circuitboard and secondly integrating the circuits into the main board of the electronic device via the connector can satisfy the mechanical design of the limited space inside the electronic device and the layout requirements and obtain more margins. And the auto focus function of the imaging lens module is more flexibly controlled via the touch screen of the electronic device. In other embodiment (not shown), the sensing elements and the auxiliary optical elements can also be disposed on the main board of the electronic device or carrier boards in other forms according to requirements of the mechanical design and the circuit layout.

In addition, the electronic device 500 can further include, but not be limited to, a display, a control unit, a storage unit, a random access memory, a read-only memory, or the combination thereof.

6th Embodiment

Figure 6:
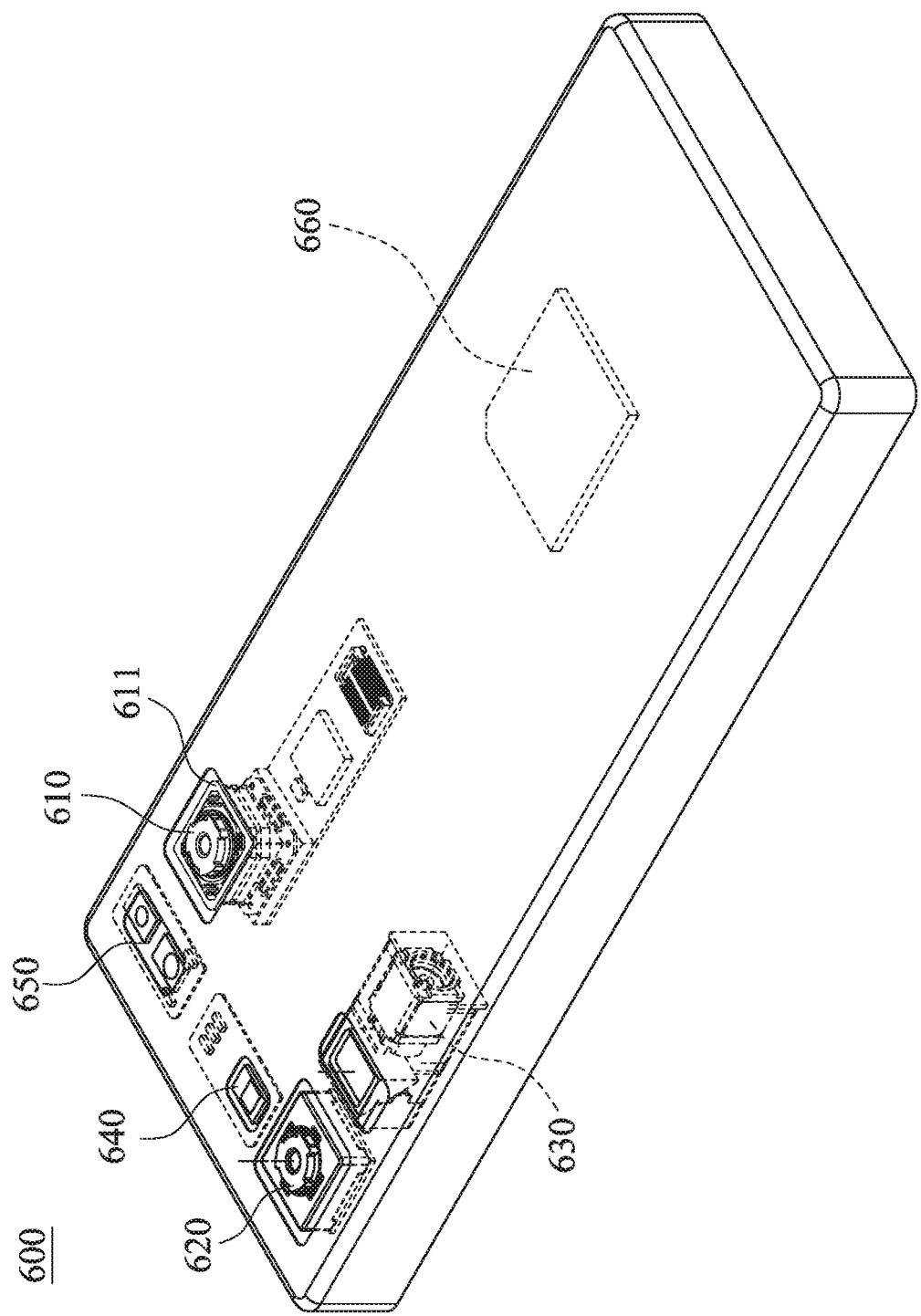
FIG. 6 is a schematic view of an electronic device according to the 6th embodiment of the present disclosure.

FIG. 6 is a schematic view of an electronic device 600 according to the 6th embodiment of the present disclosure. In FIG. 6, the electronic device 600 of the 6th embodiment is a smartphone. The electronic device 600 includes three camera modules 610, 620, 630, a flash module 640, a focus assisting module 650, an imaging signal processor 660, a user interface (not shown) and an image software processor (not shown), wherein the camera modules 610, 620, 630 are all facing the same side (toward the object side). When the user captures images of an imaged object via the user interface, the electronic device 600 focuses and generates an image via the camera modules 610, 620, 630 while compensating for low illumination via the flash module 640 when necessary. Then, the electronic device 600 quickly focuses on the imaged object according to its object distance information provided by the focus assisting module 650, and optimizes the image via the imaging signal processor 660 and the image software processor. Thus, the image quality can be further enhanced. The focus assisting module 650 can adopt infrared or laser for obtaining quick focusing, and the user interface can utilize a touch screen or a physical button for capturing and processing the image with various functions of the image processing software.

In the 6th embodiment, the camera modules 610, 620, 630 can include any of the optical lens assembly of the 1st embodiment to the 4th embodiment, respectively, and is not limited thereto.

Further, in the 6th embodiment, the optical anti-shake component 611 is disposed outside the camera modules 610, and the optical anti-shake component 611 can be an Optical Image Stabilization (OIS). The camera module 630 is a telephoto lens assembly, and the present disclosure is not limited thereto.

7th Embodiment

Figure 7:
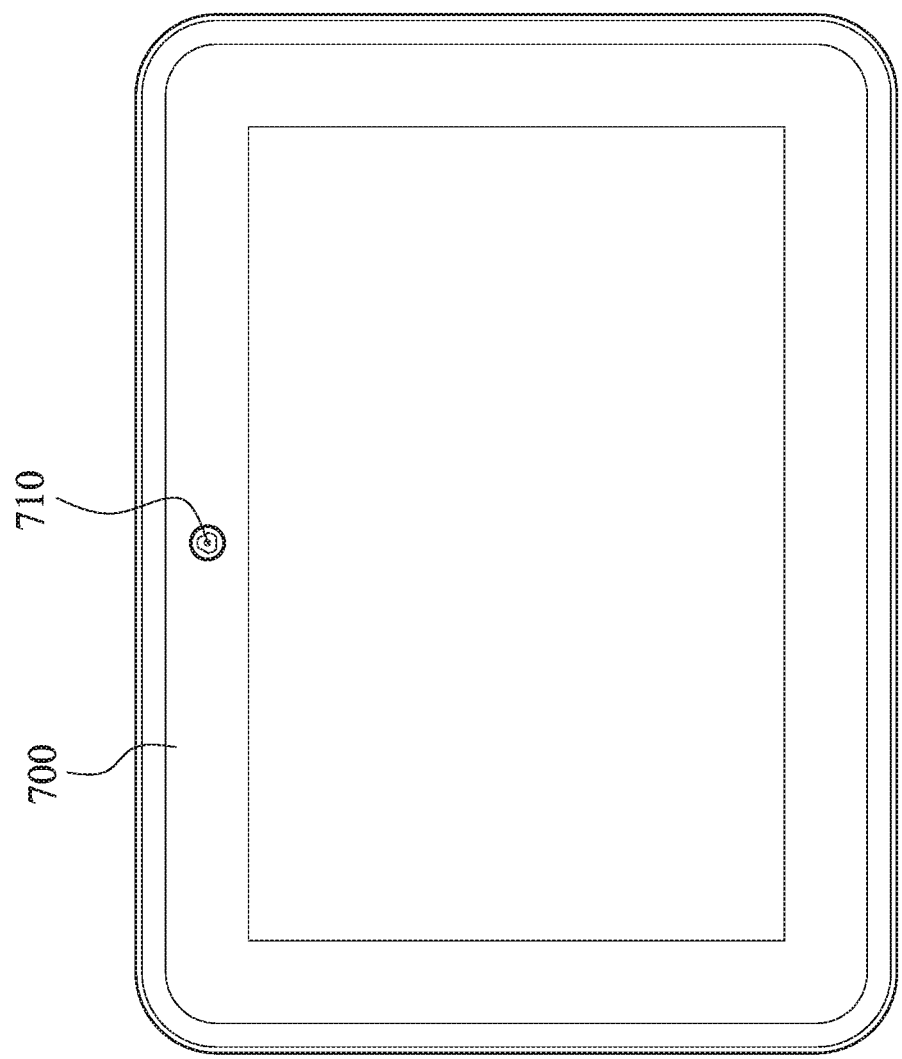
FIG. 7 is a schematic view of an electronic device according to the 7th embodiment of the present disclosure.

FIG. 7 is a schematic view of an electronic device 700 according to the 7th embodiment of the present disclosure. The electronic device 700 of the 7th embodiment is a tablet, and the electronic device 700 includes a camera module 710 according to the present disclosure, wherein the camera module 710 includes an optical lens assembly (not shown) and an image sensor (not shown), and the image sensor is disposed on an image surface (not shown) of the optical lens assembly.

8th Embodiment

Figure 8:
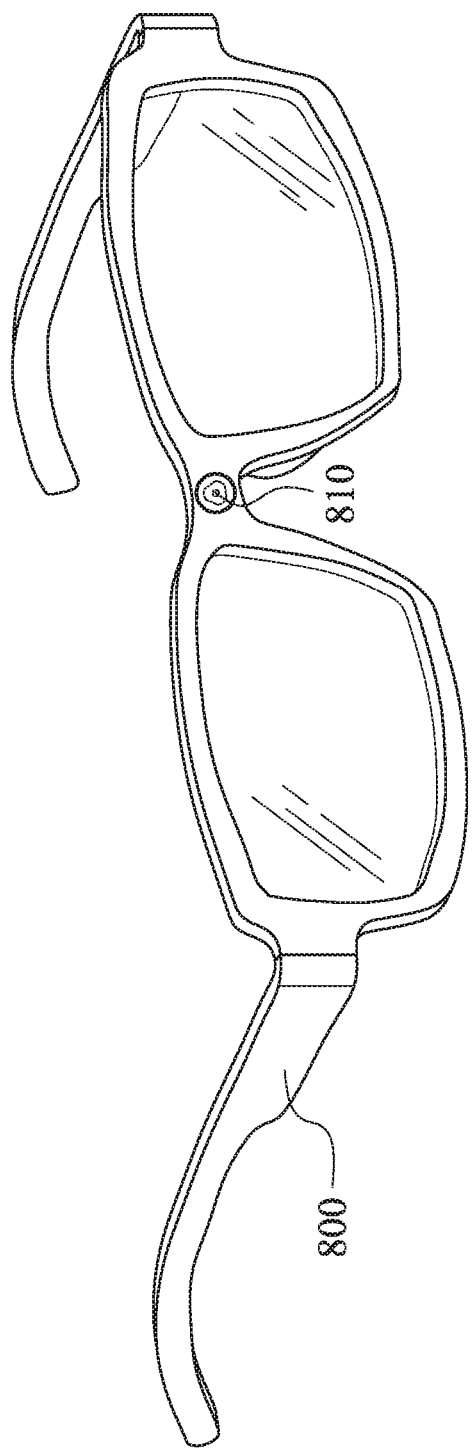
FIG. 8 is a schematic view of an electronic device according to the 8th embodiment of the present disclosure.

FIG. 8 is a schematic view of an electronic device 800 according to the 8th embodiment of the present disclosure. The electronic device 800 of the 8th embodiment is a wearable device, and the electronic device 800 includes a camera module 810 according to the present disclosure, wherein the camera module 810 includes an optical lens assembly (not shown) and an image sensor (not shown), wherein the image sensor is disposed on an image surface (not shown) of the optical lens assembly.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, having a central axis, and comprising at least one dual molded lens element, the dual molded lens element comprising:
   a light transmitting portion comprising:
   an optical effective region; and
   a lens peripheral region surrounding the optical effective region; and
   a light absorbing portion surrounding the optical effective region, wherein the light transmitting portion and the light absorbing portion are made of different plastic materials with different colors, and are integrally formed by an injection molding, and the light transmitting portion or the light absorbing portion comprises:
   a plurality of annular convex structures surrounding the central axis, wherein a cross section of each of the annular convex structures passing through the central axis comprises:
   a peak point being a closest point to the central axis of each of the annular convex structures; and
   two valley points, wherein projecting positions of the two valley points on the central axis are located on two sides of a projecting position of the peak point on the central axis;
   wherein the projecting position of the peak point on the central axis does not overlap with each of the projecting positions of the valley points on the central axis, and the projecting positions of the annular convex structures perpendicular to the central axis overlap with a projecting position of the light transmitting portion perpendicular to the central axis;
   wherein the two valley points are a first valley point and a second valley point, respectively, and a distance between a projecting position of the first valley point on the central axis and the projecting position of the peak point on the central axis is greater than a distance between a projecting position of the second valley point on the central axis and the projecting position of the peak point on the central axis.

2. The optical lens assembly of claim 1, wherein the light absorbing portion and the light transmitting portion of the dual molded lens element are made by a dual-shot injection molding.

3. The optical lens assembly of claim 2, wherein the projecting position of at least one of the annular convex structures on the central axis overlaps with a projecting position of the optical effective region on the central axis.

4. The optical lens assembly of claim 3, wherein a number of the annular convex structures is at least three.

5. The optical lens assembly of claim 2, wherein distances between each of the projecting positions of the valley points on the central axis and the projecting position of the peak point on the central axis are different.

6. The optical lens assembly of claim 2, wherein the distance between the projecting position of the first valley point on the central axis and the projecting position of the peak point on the central axis is DG1, the distance between the projecting position of the second valley point on the central axis and the projecting position of the peak point on the central axis is DG2, and the following condition is satisfied:

$$1.1 < DG1/DG2 < 25.0.$$

7. The optical lens assembly of claim 6, wherein the distance between the projecting position of the first valley point on the central axis and the projecting position of the peak point on the central axis is DG1, the distance between the projecting position of the second valley point on the central axis and the projecting position of the peak point on the central axis is DG2, and the following condition is satisfied:

$$1.1 < DG1/DG2 < 17.0.$$

8. The optical lens assembly of claim 2, wherein each of the annular convex structures has a smooth surface.

9. The optical lens assembly of claim 2, further comprising a plurality of optical elements;
   wherein the dual molded lens element further comprises at least one axial connecting structure disposed on at least one of the light absorbing portion and the light transmitting portion, wherein the axial connecting structure comprises an axial connecting surface and at least one receiving surface, the receiving surface is farther from the optical effective region than the axial connecting surface is therefrom;
   wherein the axial connecting surface is for aligning the dual molded lens element with at least one of the optical elements which is adjacent thereto.

10. The optical lens assembly of claim 9, wherein an angle between the axial connecting surface and the receiving surface is $\alpha$, and the following condition is satisfied:

$$95 \text{ degrees} < \alpha < 135 \text{ degrees}.$$

11. The optical lens assembly of claim 9, wherein the axial connecting structure is disposed on at least the light absorbing portion.

12. The optical lens assembly of claim 9, wherein the axial connecting structure is aligned with at least two of the optical elements which are adjacent thereto.

13. An electronic device, comprising:
    a camera module comprising the optical lens assembly of claim 1 and an image sensor disposed on an image surface of the optical lens assembly.

14. An electronic device, comprising:
    at least two camera modules facing to a same side, wherein at least one of the camera modules comprises the optical lens assembly of claim 1 and an image sensor disposed on an image surface of the optical lens assembly.

* * * * *